(12) United States Patent
Baxendale et al.

(10) Patent No.: US 11,391,256 B2
(45) Date of Patent: Jul. 19, 2022

(54) METHODS AND SYSTEM FOR CONTROLLING ENGINE STOP POSITION

(71) Applicant: Ford Global Technologies, LLC, Dearborn, MI (US)

(72) Inventors: Timothy Baxendale, Royal Oak, MI (US); Thomas Ciccone, West Bloomfield, MI (US); Corey Blue, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 16/985,712

(22) Filed: Aug. 5, 2020

(65) Prior Publication Data

US 2022/0042485 A1 Feb. 10, 2022

(51) Int. Cl.
| | |
|---|---|
| *B60W 10/06* | (2006.01) |
| *F02N 11/08* | (2006.01) |
| *B60W 10/18* | (2012.01) |
| *B60W 10/10* | (2012.01) |
| *B60W 10/02* | (2006.01) |
| *B60W 30/00* | (2006.01) |
| *B60W 20/40* | (2016.01) |
| *B60W 10/08* | (2006.01) |

(52) U.S. Cl.
CPC ......... *F02N 11/0859* (2013.01); *B60W 10/02* (2013.01); *B60W 10/06* (2013.01); *B60W 10/08* (2013.01); *B60W 10/10* (2013.01); *B60W 10/18* (2013.01); *B60W 20/40* (2013.01); *B60W 30/00* (2013.01); *B60W 2510/0638* (2013.01); *B60W 2510/0685* (2013.01); *B60W 2510/1005* (2013.01); *B60W 2710/02* (2013.01); *B60W 2710/08* (2013.01); *B60W 2710/1005* (2013.01); *B60W 2710/18* (2013.01); *F02N 2200/021* (2013.01); *F02N 2200/022* (2013.01); *F02N 2200/0802* (2013.01)

(58) Field of Classification Search
CPC ...... B60W 10/06; B60W 10/10; B60W 10/08; B60W 2510/0638; B60W 2510/0685; B60W 2710/08; B60W 2710/1005; B60W 2710/18; F02N 11/0859; F02N 2200/021
See application file for complete search history.

(56) References Cited

U.S. PATENT DOCUMENTS

| | | | | |
|---|---|---|---|---|
| 9,821,805 | B2* | 11/2017 | Matsushita | ........... F02N 99/002 |
| 2006/0081207 | A1* | 4/2006 | Nakamura | ............ F02N 19/005 |
| | | | | 123/179.3 |
| 2012/0160202 | A1 | 6/2012 | Vogt et al. | |
| 2013/0060455 | A1* | 3/2013 | Kawasumi | .............. F02D 28/00 |
| | | | | 701/113 |
| 2013/0328323 | A1 | 12/2013 | Reik et al. | |
| 2019/0145368 | A1* | 5/2019 | Nakaoka | ............. F02N 11/0851 |
| | | | | 123/179.3 |
| 2021/0293214 | A1* | 9/2021 | Umashankar | ........... F02N 11/04 |

* cited by examiner

*Primary Examiner* — Roger L Pang
(74) *Attorney, Agent, or Firm* — David Kelley; McCoy Russell LLP

(57) ABSTRACT

A method and system for controlling a stop rotation position of an engine is described. In one example, the system includes an integrated starter/generator that may be selectively coupled to the engine. The integrated starter/generator may rotate the engine in a first direction (e.g., reverse direction) or a second direction (e.g., a forward direction) in response to a position at which the engine stops rotating following cessation of combustion in the engine.

5 Claims, 5 Drawing Sheets

METHODS AND SYSTEM FOR CONTROLLING ENGINE STOP POSITION

FIELD

The present description relates to methods and a system for controlling a position at which an engine is stopped rotating. The methods and systems may be suitable for engines that may be started via an electric machine.

BACKGROUND AND SUMMARY

An engine of a vehicle may include an electric machine to rotate an engine before the engine is started. The electric machine may be a conventional starter, a belt integrated starter generator (BISG), or an integrated starter generator (ISG) that is positioned between an engine and a transmission. If the engine stops rotating and a piston of the engine is near top-dead-center compression stroke of the cylinder in which the piston reciprocates, it may be difficult for the electric machine to rotate the engine when a subsequent engine start is requested. In addition, an amount of in-rush current to the electric machine may be higher when it is difficult to rotate an engine that is stopped with a piston near top-dead-center compression stroke. Consequently, degradation of the electric machine may be increased. Therefore, it may be desirable to provide a way of starting an engine so that load on the electric machine may be reduced.

The inventors herein have recognized the above-mentioned issues and have developed a method for an engine, comprising: rotating an engine via an electric machine in a first direction in response to the engine having stopped rotating in a position where a piston of a cylinder of the internal combustion engine is within a predetermined crankshaft angle of top-dead-center compression stroke of the cylinder; and rotating the engine via the electric machine in a second direction without rotating the engine in the first direction in response to the engine having stopped rotating in a position where the piston of the cylinder is not within the predetermined crankshaft angle of top-dead-center compression stroke of the cylinder.

By rotating an engine in a reverse direction in response to the engine having stopped with a piston being within a threshold crankshaft angle of top-dead-center compression stroke of the piston's cylinder, it may be possible to provide the technical result reducing peak torque used to start an engine. On the other hand, if the engine is not within a threshold crankshaft angle of top-dead-center compression stroke of the piston's cylinder, the engine may not be rotated before the next engine restart so that electric energy may be conserved. In addition, since the engine may be rotated with less effort after the engine has been rotated away from top-dead-center compression stroke of the cylinder, electric current in-rush to the electric machine may be reduced so that a possibility of electric machine degradation may be reduced.

The present description may provide several advantages. Specifically, the approach may reduce an amount of effort to rotate an engine during engine starting. Further, the approach may reduce degradation of an electric machine by reducing electric current in-rush to the electric machine. In addition, the approach may reduce engine starting time since a belt integrated starter/generator may start the engine without assistance from an integrated starter/generator.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
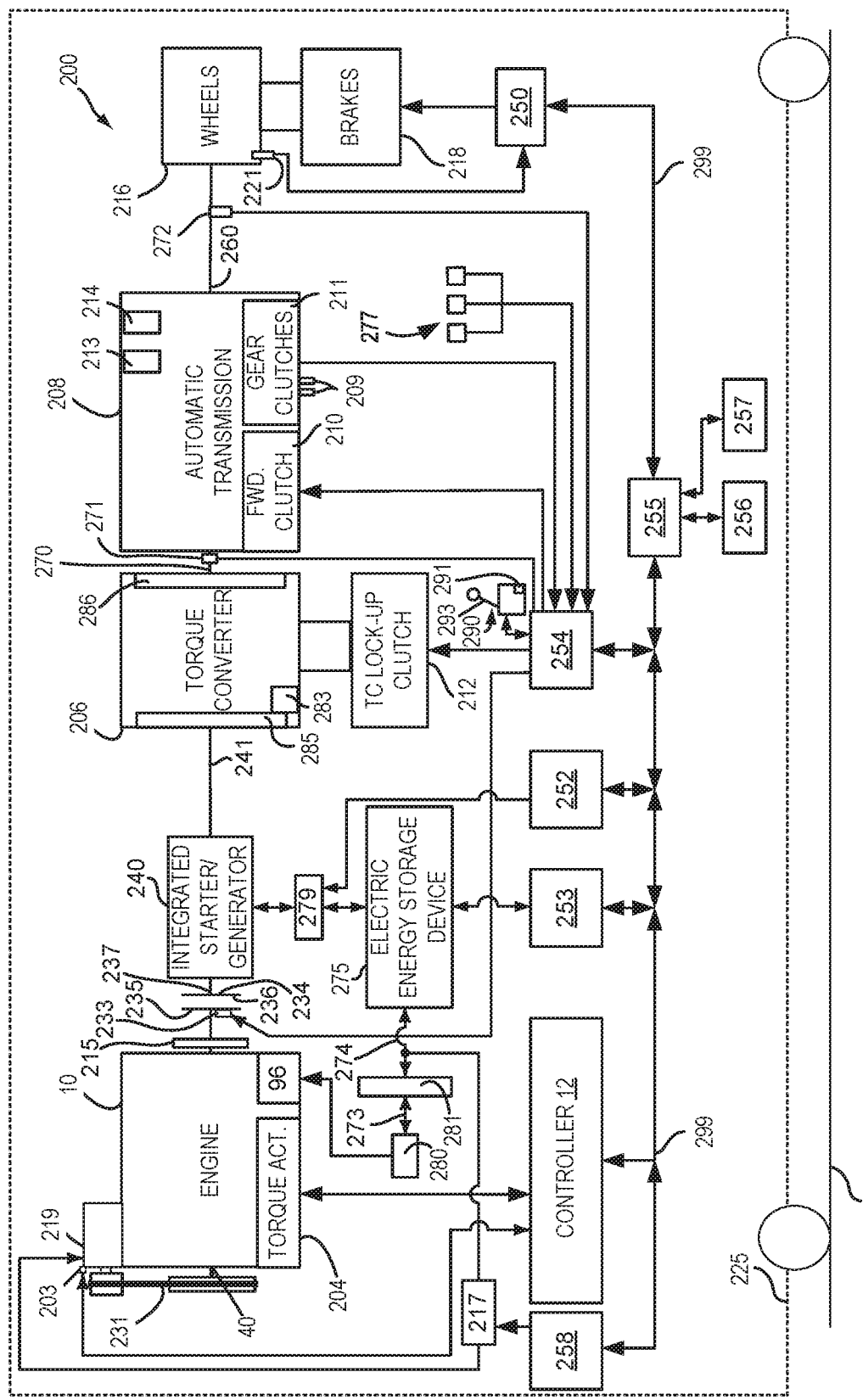
FIG. 2 shows a schematic diagram of an example vehicle driveline or powertrain including the internal combustion engine shown in FIG. 1.
Figure 3:
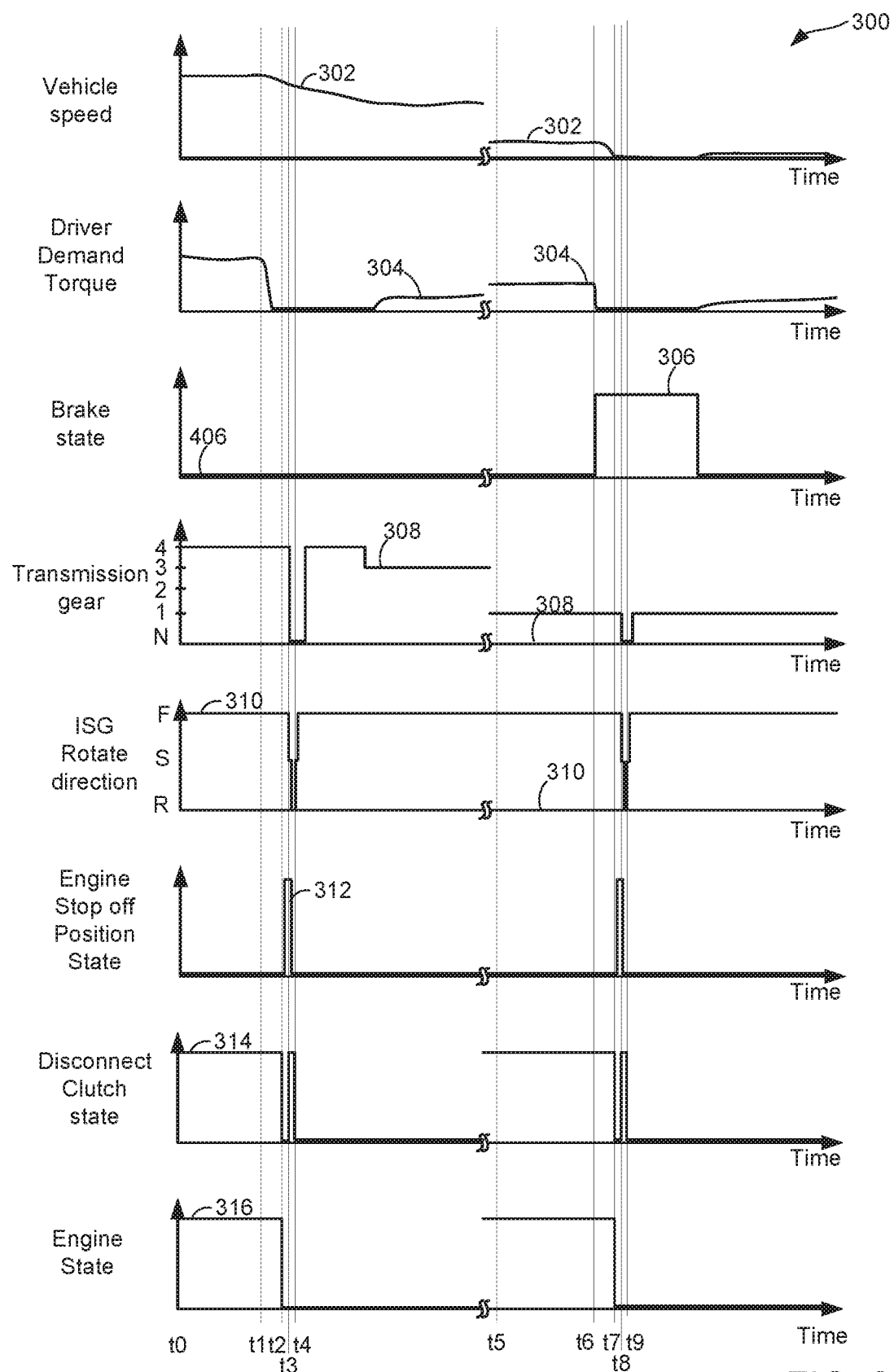
FIG. 3 shows two example engine stopping sequences according to the method of FIGS. 4 and 5.
Figure 4:
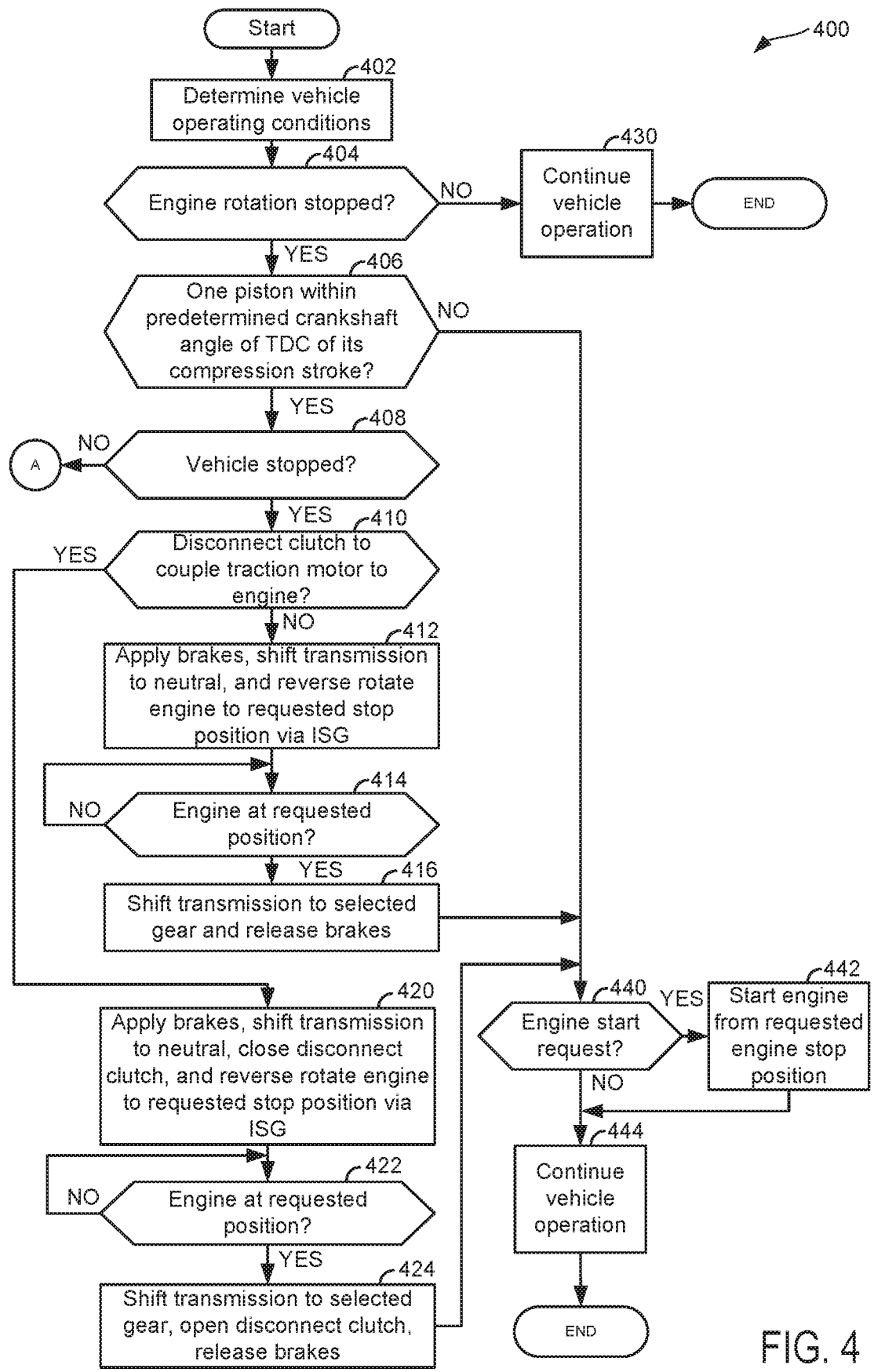
FIGS. 4 and 5 show an example method for starting an engine and stopping the engine at a desired or requested crankshaft position.
Figure 5:
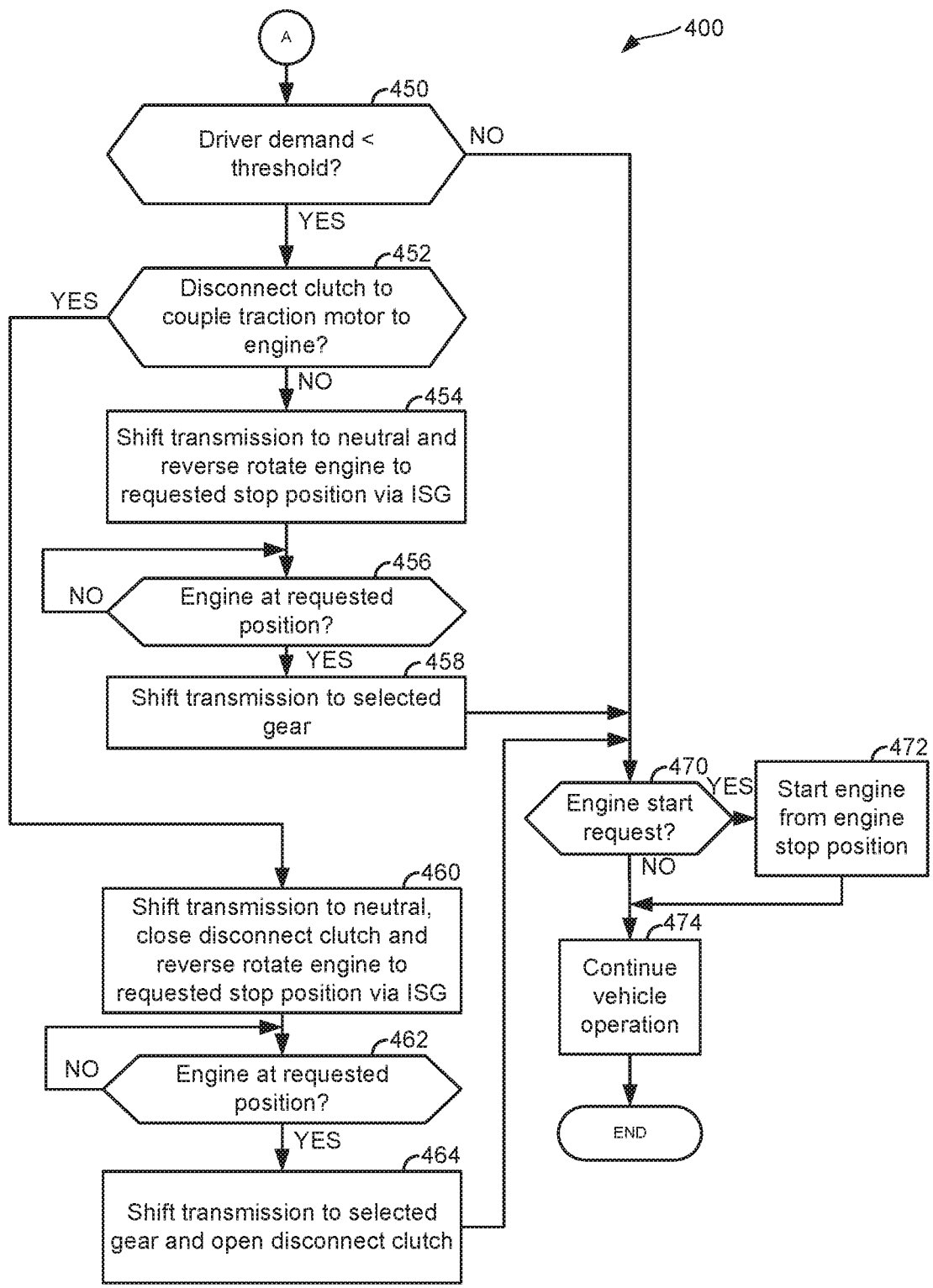

The present description is related to adjusting a crankshaft position of an engine after the engine has stopped. The engine's crankshaft position may be adjusted by rotating the crankshaft via an electric machine when a piston of the engine is within a threshold crankshaft angle of top-dead-center compression stroke of a cylinder that houses the piston. If the engine's crankshaft position is within a threshold crankshaft angle of top-dead-center compression stroke of the cylinder, it may be difficult for the electric machine to rotate the engine in a forward direction (e.g., counter-clockwise) through the top-dead-center compression stroke because of an amount of energy needed to compress air that is trapped in the cylinder. However, if the engine is rotated in a reverse direction (e.g., clockwise) such that the engine is within a predetermined crankshaft angular window, less energy may be needed to rotate the engine in the forward direction a next time an engine restart is requested. The engine may rotate through top-dead-center compression stroke with less effort if the engine is rotating at speed by leveraging the engine's inertia. The methods described herein may be applied to an engine of the type shown in FIG. 1. The engine may be included in a driveline as shown in FIG. 2. The driveline may include more than one engine starting device. In one example, a conventional starter, a belt integrated starter/generator (BISG), and integrated starter/generator (ISG) are included in a driveline for starting an engine. FIG. 3 shows two example engine stopping sequences according to the method of FIGS. 4 and 5. FIGS. 4 and 5 show an example method for repositioning an engine after the engine has stopped rotating in response to ceasing combustion in the engine.

Figure 1:
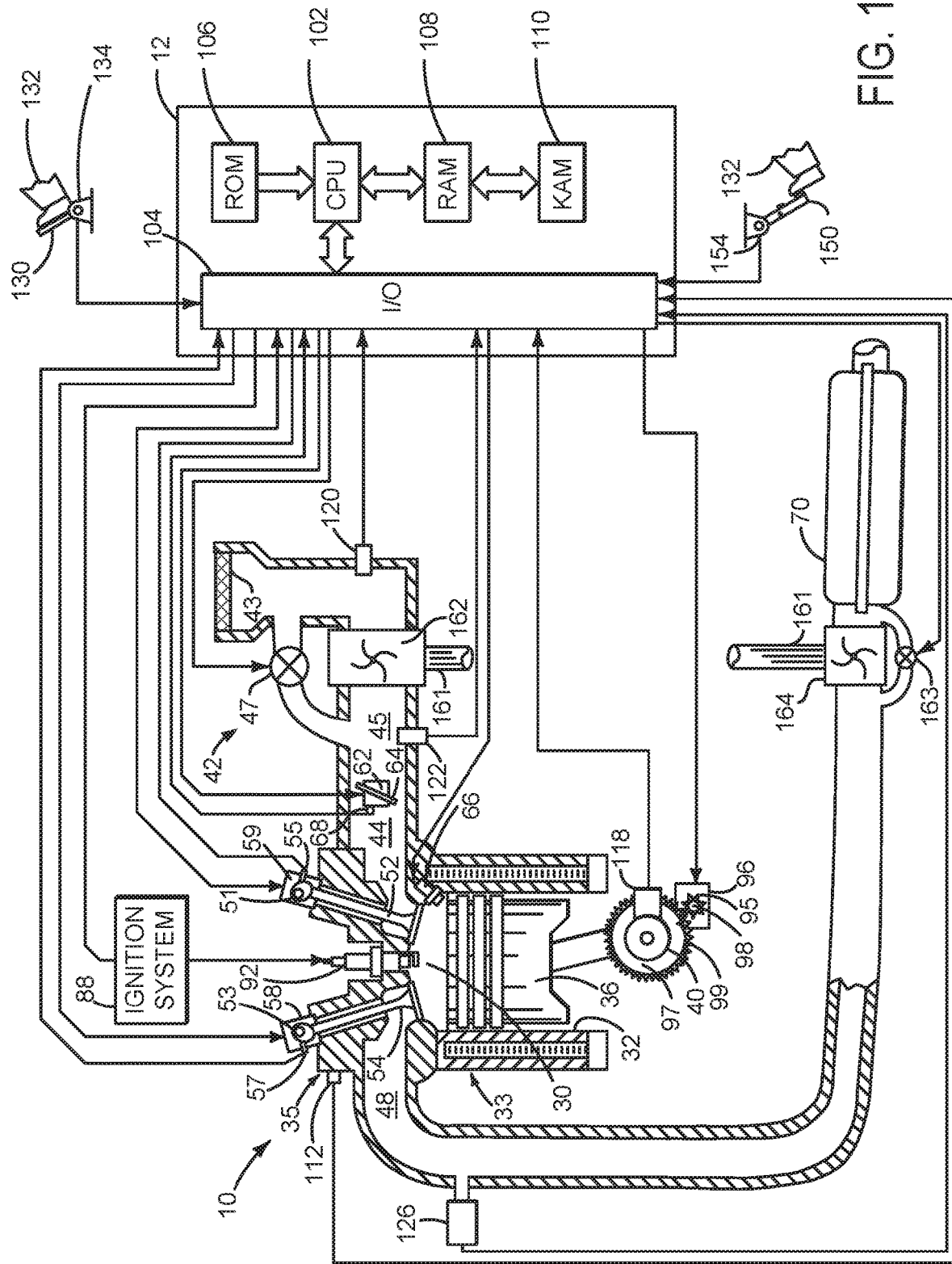
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104 (e.g., including analog to digital converters, digital inputs, digital outputs, pulse width outputs, radio frequency inputs, radio frequency outputs, etc.), read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an propulsion pedal 130 for sensing force applied by human foot 132; a position sensor 154 coupled to brake pedal 150 for sensing force applied by foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200 that may travel on road 226. The powertrain of FIG. 2 includes engine 10 shown in FIG. 1. Powertrain 200 is shown including vehicle system controller 255, engine controller 12, electric machine controller 252, transmission controller 254, BISG controller 258, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, BISG controller 258, transmission controller 254, and brake controller 250 to achieve driver input requests and other requests that are based on vehicle operating conditions.

For example, in response to a driver releasing a propulsion pedal and vehicle speed, vehicle system controller 255 may request a desired wheel power or a wheel power level to provide a desired rate of vehicle speed change. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In response to an engine starting request, BISG controller 258 may command BISG 219 to rotate and start engine 10. Likewise, electric machine controller 252 may rotate ISG 240 to rotate and start engine 10 while disconnect clutch 236 is closed. In addition, BISG controller 258 and electric machine controller 252 may output torque and speed of BISG 219 and ISG 240 to CAN 299 to be received by one or more of the other previously mentioned controllers during engine starting to provide feedback as to the operating states of these engine starting systems.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240 (e.g., ISG). In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via high voltage bus 274 via inverter 217. Inverter 217 converts direct current (DC) power from high voltage bus 274 to alternating current (AC) and vice-versa so that power may be exchanged between BISG 219 and electric energy storage device 275. Thus, BISG 219 may operate as a generator supplying electrical power to high voltage electric energy storage device (e.g., battery) 275 and/or low voltage bus 273. Bi-directional DC/DC converter 281 may transfer electrical energy from a high voltage buss 274 to a low voltage bus 273 or vice-versa. Low voltage battery 280 is electrically directly coupled to low voltage bus 273. Low voltage bus 273 may be comprised of one or more electrical conductors. Electric energy storage device 275 is electrically coupled to high voltage bus 274. Low voltage battery 280 may selectively supply electrical energy to starter motor 96.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237. In some examples, driveline disconnect clutch 236 may be omitted.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be transferred to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information.

In response to a request to increase speed of vehicle 225, vehicle system controller may obtain a driver demand power or power request from a propulsion pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel torque limit of 50 N-m, ISG power is adjusted to provide less than 50 N-m (e.g., 49 N-m) of negative torque at the wheels, including compensating for transmission gearing.

Referring now to FIG. 3, an example vehicle operating sequence is shown. The sequence of FIG. 3 may be generated via the system of FIGS. 1 and 2 in cooperation with the method of FIGS. 4 and 5. Vertical lines at times t0-t8 represent times of interest during the sequence. The plots in FIG. 3 are time aligned and occur at the same time. The SS marks along each of the horizontal axes represent breaks in time that may be short or long in duration.

The first plot from the top of FIG. 3 is a plot of vehicle speed versus time. The vertical axis represents vehicle speed and vehicle speed increases in the direction of the vertical axis arrow. The horizontal axis represents time and the amount of time increases from the left side of the plot to the right side of the plot. Trace 302 represents the vehicle speed.

The second plot from the top of FIG. 3 is a plot of driver demand torque versus time. The vertical axis represents the driver demand torque and the driver demand torque amount increases in the direction of the vertical axis arrow. The horizontal axis represents time and the amount of time increases from the left side of the plot to the right side of the plot. Trace 304 represents the driver demand torque.

The third plot from the top of FIG. 3 is a plot of vehicle friction brake state versus time. The vertical axis represents the vehicle friction brake state and the vehicle friction brakes are applied when trace 306 is at a higher level near the vertical axis arrow. The vehicle friction brakes are not applied when trace 306 is at a lower level near the horizontal axis. The horizontal axis represents time and the amount of time increases from the left side of the plot to the right side of the plot. Trace 306 represents the vehicle friction brake state.

The fourth plot from the top of FIG. 3 is a plot showing which transmission gear is presently engaged versus time. The vertical axis represents the transmission gear that is engaged and the forward gears 1-4 are indicated along the vertical axis. The transmission is in neutral when trace 308 is near the horizontal axis. The horizontal axis represents time and time increases from the left side of the plot to the right side of the plot. Trace 308 represents the engaged transmission gear.

The fifth plot from the top of FIG. 3 is a plot that indicates the direction of ISG rotation. The vertical axis represents the direction of ISG rotation and the ISG rotates in a forward direction (e.g., counter-clockwise) when providing positive torque to propel the vehicle. The ISG rotates in a forward direction when trace 310 is at a higher level near the vertical axis arrow. The ISG rotates in a reverse direction when trace 310 is at a lower level near the horizontal axis. Trace 310 indicates the direction of ISG rotation. The horizontal axis represents time and time increases from the left side of the plot to the right side of the plot.

The sixth plot from the top of FIG. 3 is a plot of an engine stop off position state versus time. The vertical axis represents the engine stop off position state and the engine is stopped with a piston of a cylinder that is within a predetermined crankshaft angle of top-dead-center compression stroke of the cylinder when trace 312 is at a higher level near the vertical axis arrow. In other words, the engine is stopped off, or away from, a desired or requested engine stop position (e.g., crankshaft angle). The engine is not stopped with a piston of a cylinder that is within a predetermined crankshaft angle of top-dead-center compression stroke of the cylinder when trace 312 is at a lower level near the horizontal axis. The horizontal axis represents time and time increases from the left side of the plot to the right side of the plot. Trace 312 represents the engine stop off position state.

The seventh plot from the top of FIG. 3 is a plot of disconnect clutch state versus time. The vertical axis represents the disconnect clutch state and the disconnect clutch is fully closed when trace 314 is at a higher level near the vertical axis arrow. The disconnect clutch is open when trace 314 is at a lower level near the horizontal axis. The horizontal axis represents time and time increases from the left side of the plot to the right side of the plot. Trace 314 represents the disconnect clutch state.

The eighth plot from the top of FIG. 3 is a plot of engine state versus time. The vertical axis represents the engine state and the engine is running (e.g., rotating and combusting fuel) when trace 316 is at a higher level near the vertical axis arrow. The engine is stopped (e.g., not rotating or commanded to stop) when trace 316 is at a lower level near the horizontal axis. The horizontal axis represents time and time increases from the left side of the plot to the right side of the plot. Trace 316 represents the engine state.

At time t0, the engine is running and the vehicle is moving a medium speed. The driver demand torque is at a middle level and the friction brakes are not applied. The transmission is engaged in fourth gear and the ISG is rotating in a forward direction. The engine is not stopped and the disconnect clutch is fully closed.

At time t1, the driver demand torque is reduced while the engine continues to run. The vehicle speed begins to fall in response to the driver demand torque reduction. The brake is not applied and the transmission remains engaged in fourth gear. The ISG continues to rotate in a forward direction and the engine is not stopped. The driveline disconnect clutch is fully closed.

At time t2, the disconnect clutch is fully opened and the engine stops rotating shortly thereafter in response to the low driver demand torque. The vehicle speed continues to fall and the driver demand torque remains low. The brake is not applied and the transmission remains engaged in fourth gear. The ISG continues to rotate in a forward direction. The engine stops at an off position (e.g., the engine is stopped off, or away from, a desired or requested engine stop position) shortly after time t2.

At time t3, the transmission is shifted to neutral and ISG is stopped rotating. The ISG is rotated in a reverse direction shortly after time t3 and the disconnect clutch is at least partially closed, or alternatively fully closed, shortly after time t3. This causes the engine to rotate in a reverse direction via the ISG without slowing the vehicle due to engine and ISG rotation. The engine stop off position state is no longer asserted as the engine rotates. The driver demand torque remains low and the brakes are not applied. The engine is not running.

At time t4, the engine crankshaft angle is within a desired or requested range, which causes the ISG to stop rotating. In addition, the disconnect clutch is fully opened. Shortly after the disconnect clutch is fully opened the ISG begins to rotate in the forward direction and the ISG speed is matched to the transmission input shaft speed. The transmission is shifted to fourth gear shortly after the ISG rotational speed is equal to the rotational speed of the transmission input shaft.

Between time t4 and time t5, the transmission is downshifted into third gear and the vehicle speed levels off. A break in the engine operating sequence occurs between time t4 and time t5.

Thus, the engine may be reverse rotated while a vehicle is moving via the ISG so that it may be in a position that reduces electric energy consumption during a subsequent engine restart. Shifting the transmission into neutral allows the ISG to rotate the engine in a reverse direction and reposition the engine's crankshaft, which may not be possible or advisable for the BISG because of belt tensioning issues. In this way the ISG may be rotated in a reverse direction without disturbing wheel rotation.

At time t5, the engine is running and the vehicle is moving a low speed. The driver demand torque is at a low level and the friction brakes are not applied. The transmission is engaged in first gear and the ISG is rotating in a forward direction. The engine is not stopped and the disconnect clutch is fully closed.

At time t6, the driver demand torque is reduced while the engine continues to run. The vehicle speed begins to fall in response to the driver demand torque reduction. The friction brakes are applied by the vehicle operator shortly thereafter and the transmission remains engaged in first gear. The ISG continues to rotate in a forward direction and the engine is not stopped. The driveline disconnect clutch is fully closed.

At time t7, the disconnect clutch is fully opened and the engine crankshaft stops rotating shortly thereafter in response to the low driver demand torque. The vehicle speed continues to fall and the driver demand torque remains low. The friction brakes remain applied by the operator and the vehicle controller also requests friction brakes (not shown) in case the operator releases the brake. However, the vehicle controller may release the friction brakes if driver demand torque is increased. The transmission is shifted to neutral gear. The ISG continues to rotate in a forward direction. The engine crankshaft stops at an off position (e.g., the engine is stopped off, or away from, a desired or requested engine stop position) shortly after time t7.

At time t8, the transmission is shifted to neutral and ISG is stopped rotating. The ISG is rotated in a reverse direction shortly after time t8 and the disconnect clutch is at least partially closed, or alternatively fully closed, shortly after time t8. This causes the engine to rotate in a reverse direction via the ISG. The engine stop off position state is no longer asserted as the engine rotates. The driver demand torque remains low and the brakes are not applied. The engine is not running.

At time t9, the engine crankshaft angle is within a desired or requested range, which causes the ISG to stop rotating. In addition, the disconnect clutch is fully opened. Shortly after the disconnect clutch is fully opened the ISG is configured to rotate in the forward direction. In some examples, the ISG may rotate the transmission input shaft to operate the transmission's pump. The transmission is shifted to first gear.

Thus, the engine crankshaft may be reverse rotated while a vehicle is stopped via the ISG so that it may be in a position that reduces electric energy consumption during a subsequent engine restart. It may be desirable to rotate the engine in the reverse direction via the ISG instead of rotating the engine in the reverse direction via the BISG because of belt slip and tension.

Referring now to FIG. 4, an example method for operating a vehicle that includes engine is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to vehicle speed, propulsion pedal position, brake pedal position, state of battery charge, engine temperature and driver demand torque. Method 400 proceeds to 404.

At 404, method 400 judges if engine crankshaft rotation has stopped. Method 400 may judges that engine crankshaft rotation has stopped based on output of an engine position sensor. If method 400 judges that engine rotation has stopped, the answer is yes and method 400 proceeds to 406. Otherwise, the answer is no and method 400 proceeds to 430.

At 430, method 400 continues to operate the engine in its present state and according to engine and vehicle operating conditions. For example, if driver demand torque is increasing, engine torque may be increased. Method 400 proceeds to exit.

At 406, method 400 judges if one piston in a cylinder of an engine is within a predetermined crankshaft (e.g., 45 degrees) angle of top-dead-center compression stroke of the cylinder. Method 400 may judge such condition according to output of the engine's crankshaft position sensor. If method 400 judges that at least one piston in a cylinder of an engine is within a predetermined crankshaft angle of top-dead-center compression stroke of the cylinder, the answer is yes and method 400 proceeds to 408. Otherwise, the answer is no and method 400 proceeds to 440. In some examples, the BISG engine starting system may be temporarily deactivated when the engine is within a predetermined crankshaft angular distance of top-dead-center compression stroke so that the possibility of BISG degradation may be reduced. The ISG engine starting system may be permitted to activate and start the engine during such conditions, if desired.

At 440, method 400 judges if an engine start is requested. An engine start may be requested via a vehicle operator and a human/machine interface, the vehicle controller, or a remote starting device. If method 400 judges that an engine start is requested, the answer is yes and method 400 proceeds to 442. Otherwise, the answer is no and method 400 proceeds to 444.

At 442, method starts the engine via an electric machine (e.g., BISG 219 or ISG 240). The engine crankshaft is rotated in a forward direction (e.g., counter-clockwise) via the electric machine and spark and fuel are supplied to the engine. Method 400 proceeds to 444.

At 444, method 400 continues to operate the engine in its present state and according to engine and vehicle operating conditions. Method 400 proceeds to exit.

At 408, method 400 judges if a vehicle that includes the engine is stopped (e.g., not moving on a road which the vehicle is traveling on). In one example, method 400 may judge that the vehicle is stopped based on a vehicle speed sensor. If method 400 judges that the vehicle is stopped, the answer is yes and method 400 proceeds to 410. Otherwise, the answer is no and method 400 proceeds to 450.

At 410, method 400 judges if the vehicle includes a driveline disconnect clutch to decouple the traction motor from the engine (e.g., ISG 240). In one example, a value of a bit, byte, or word in controller memory may indicate the vehicle's driveline configuration. If method 400 judges that the vehicle includes a driveline disconnect clutch, the answer is yes and method 400 proceeds to 420. Otherwise, the answer is no and method 400 proceeds to 412.

At 412, method 400 applies the vehicle's friction brakes so that the vehicle may be held stopped. In addition, method 400 shifts the vehicle's transmission into neutral so that ISG torque may not be delivered to the vehicle's wheels. Method 400 also rotates the engine's crankshaft in a reverse direction (e.g., clockwise) as compared to the direction that the engine rotates when it is propelling the vehicle. The engine's crankshaft may be rotated in the reverse direction via ISG 240 to a desired or requested engine stopping position. The engine is not supplied fuel when it is rotated in the reverse direction. The engine may be rotated in a reverse direction until the engine crankshaft is within a predetermined crankshaft angular range. In one example, the engine's crankshaft is reverse rotated such that the cylinder with the piston that is within the threshold crankshaft angle of top-dead-center compression stroke is reverse rotated so that the cylinder is outside of the threshold angle and advance of bottom-dead-center compression stroke (e.g., in the range of 179 to 46 crankshaft degrees before top-dead-center compression stroke of the cylinder). Method 400 proceeds to 414.

At 414, method 400 judges if the engine's crankshaft is at the requested engine stopping position. If so, the answer is yes and method 400 proceeds to 416. Otherwise, the answer is no and method 400 remains at 412.

At 416, method 400 shifts the transmission into a selected gear (e.g., a forward gear) and releases the vehicle's friction brakes. However, if the transmission shifter is engaged in park, the vehicle remains in park. Method 400 proceeds to 440.

At 420, method 400 applies the vehicle's friction brakes so that the vehicle may be held stopped. In addition, method 400 shifts the vehicle's transmission into neutral so that ISG torque may not be delivered to the vehicle's wheels. Method 400 also closes the driveline disconnect clutch and rotates the engine in a reverse direction (e.g., clockwise) as compared to the direction that the engine rotates when it is propelling the vehicle (e.g., counter-clockwise). The engine may be rotated in the reverse direction via ISG 240 to a desired or requested engine stopping position. The engine is not supplied fuel when it is rotated in the reverse direction. The engine's crankshaft may be rotated in a reverse direction until the engine crankshaft is within a predetermined crankshaft angular range. In one example, the engine's crankshaft is reverse rotated such that the cylinder with the piston that is within the threshold crankshaft angle of top-dead-center compression stroke is reverse rotated so that the cylinder is outside of the threshold angle and advance of bottom-dead-center compression stroke (e.g., in the range of 179 to 46 crankshaft degrees before top-dead-center compression stroke of the cylinder). Method 400 proceeds to 422.

At 422, method 400 judges if the engine is at the requested engine stopping position. If so, the answer is yes and method 400 proceeds to 424. Otherwise, the answer is no and method 400 remains at 422.

At 424, method 400 opens the driveline disconnect clutch, shifts the transmission into a selected gear (e.g., a forward gear), and releases the vehicle's friction brakes. However, if the transmission shifter is engage in park, the vehicle remains in park. Method 400 may also open the driveline disconnect clutch. Method 400 proceeds to 440.

At 450, method 400 judges if driver demand torque or power is less than a threshold. If so, the answer is yes and method 400 proceeds to 452. Otherwise, the answer is no and method 400 proceeds to 470.

At 470, method 400 judges if an engine start is requested. An engine start may be requested via a vehicle operator and a human/machine interface, the vehicle controller, or a remote starting device. If method 400 judges that an engine start is requested, the answer is yes and method 400 proceeds to 472. Otherwise, the answer is no and method 400 proceeds to 474.

At 472, method starts the engine via an electric machine (e.g., BISG 219 or ISG 240). The engine crankshaft is rotated in a forward direction (e.g., counter-clockwise) via the electric machine and spark and fuel are supplied to the engine. Method 400 proceeds to 474.

At 474, method 400 continues to operate the engine in its present state and according to engine and vehicle operating conditions. Method 400 proceeds to exit.

At 452, method 400 judges if the vehicle includes a driveline disconnect clutch to decouple the traction motor from the engine. In one example, a value of a bit, byte, or word in controller memory may indicate the vehicle's driveline configuration. If method 400 judges that the vehicle includes a driveline disconnect clutch, the answer is yes and method 400 proceeds to 460. Otherwise, the answer is no and method 400 proceeds to 454.

At 454, method 400 shifts the vehicle's transmission into neutral so that ISG torque may not be delivered to the vehicle's wheels. Method 400 also rotates the engine in a reverse direction (e.g., clockwise) as compared to the direction that the engine rotates when it is propelling the vehicle. The engine may be rotated in the reverse direction via ISG 240 to a desired or requested engine stopping position. The engine is not supplied fuel when it is rotated in the reverse direction. The engine may be rotated in a reverse direction until the engine crankshaft is within a predetermined crankshaft angular range. In one example, the engine's crankshaft is reverse rotated such that the cylinder with the piston that is within the threshold crankshaft angle of top-dead-center compression stroke is reverse rotated so that the cylinder is outside of the threshold angle and advance of bottom-dead-center compression stroke (e.g., in the range of 179 to 46 crankshaft degrees before top-dead-center compression stroke of the cylinder). Method 400 proceeds to 456.

At 456, method 400 judges if the engine's crankshaft is at the requested engine stopping position. If so, the answer is yes and method 400 proceeds to 458. Otherwise, the answer is no and method 400 remains at 456.

At 458, method 400 shifts the transmission into the selected gear. The selected gear may be based on driver demand torque or power and vehicle speed. Method 400 proceeds to 470.

At 460, method 400 shifts the vehicle's transmission into neutral so that ISG torque may not be delivered to the vehicle's wheels while the engine is reverse rotated. Method 400 also closes the driveline disconnect clutch and rotates the engine in a reverse direction (e.g., clockwise) as compared to the direction that the engine rotates when it is propelling the vehicle (e.g., counter-clockwise). The engine may be rotated in the reverse direction via ISG 240 to a desired or requested engine stopping position. The engine is not supplied fuel when it is rotated in the reverse direction. The engine may be rotated in a reverse direction until the engine crankshaft is within a predetermined crankshaft angular range. In one example, the engine's crankshaft is reverse rotated such that the cylinder with the piston that is within the threshold crankshaft angle of top-dead-center compression stroke is reverse rotated so that the cylinder is outside of the threshold angle and advance of bottom-dead-center compression stroke (e.g., in the range of 179 to 46 crankshaft degrees before top-dead-center compression stroke of the cylinder). Method 400 proceeds to 462.

At 462, method 400 judges if the engine is at the requested engine stopping position. If so, the answer is yes and method 400 proceeds to 464. Otherwise, the answer is no and method 400 remains at 462.

At 464, method 400 opens the driveline disconnect clutch and shifts the transmission into a selected gear (e.g., a forward gear). Method 400 proceeds to 470. In one example, method 400 shifts the transmission into a forward gear that is based on present vehicle speed and driver demand torque or power.

In this way, an engine may be pre-positioned for an engine start. The engine crankshaft may be reverse rotated to a position where torque to turn the crankshaft is lower so that the engine may reach cranking speed before a piston reaches top-dead-center compression stroke so that the engine may rotate through top-dead-center compression stroke using the engine's rotational inertia.

Thus, method of FIGS. 4 and 5 provides for a method for an engine, comprising: rotating an engine via an electric machine in a first direction in response to the engine having stopped rotating in a position where a piston of a cylinder of the internal combustion engine is within a predetermined crankshaft angle of top-dead-center compression stroke of the cylinder; and rotating the engine via the electric machine in a second direction without rotating the engine in the first direction in response to the engine having stopped rotating in a position where the piston of the cylinder is not within the predetermined crankshaft angle of top-dead-center compression stroke of the cylinder. The method includes where the rotating of the engine in the second direction is in further response to a request to start the engine. The method includes where the rotating of the engine in the first direction is not in response to a request to start the engine. The method includes where the electric machine is positioned between the engine and a transmission.

In some examples, the method further comprises rotating the engine via the electric machine in the first direction while a vehicle in which the engine is located is traveling on a road at greater than a threshold speed. The method further comprises rotating the engine in the first direction in further response to a driver demand being less than a threshold. The method further comprises rotating the engine in the first direction in further response to a transmission being in neutral. The method further comprises closing a disconnect clutch before rotating the engine via the electric machine. The method further comprises rotating the engine via the electric machine to a predetermined crankshaft angle.

The method of FIGS. 4 and 5 also provides for a method for operating an engine, comprising: applying vehicle brakes, shifting a transmission into neutral, and rotating an engine in a first direction via a controller in response to deactivating a first engine starting system and permitting activation of a second engine starting system in response to the engine having stopped rotating in a position where a piston of a cylinder of the internal combustion engine is within a predetermined crankshaft angle of top-dead-center compression stroke of the cylinder and a vehicle in which the engine resides is at zero speed. The method further comprises rotating the engine in a second direction, the second direction different than the first direction in response to a request to start the engine. The method further comprises shifting the transmission into a forward gear in response to the engine being rotated in the first direction to a predetermined position. The method further comprises releasing the brakes in response to the engine being rotated in the first direction to the predetermined position. The method includes where the transmission is shifted into neutral from a forward gear.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
applying vehicle brakes, shifting a transmission into neutral, and rotating an engine in a first direction via a controller in response to deactivating a first engine starting system and permitting activation of a second engine starting system in response to the engine having stopped rotating in a position where a piston of a cylinder of the internal combustion engine is within a predetermined crankshaft angle of top-dead-center compression stroke of the cylinder and a vehicle in which the engine resides is at zero speed.

2. The method of claim 1, further comprising rotating the engine in a second direction, the second direction different than the first direction in response to a request to start the engine.

3. The method of claim 1, further comprising shifting the transmission into a forward gear in response to the engine being rotated in the first direction to a predetermined position.

4. The method of claim 3, further comprising releasing the brakes in response to the engine being rotated in the first direction to the predetermined position.

5. The method of claim 1, where the transmission is shifted into neutral from a forward gear.

* * * * *